(12) United States Patent
Moen et al.

(10) Patent No.: US 8,705,682 B2
(45) Date of Patent: Apr. 22, 2014

(54) FEEDWATER TEMPERATURE CONTROL METHODS AND SYSTEMS

(75) Inventors: Stephan Craig Moen, Wilmington, NC (US); Jack Patrick Noonan, Wilmington, NC (US); Pradip Saha, Wilmington, NC (US)

(73) Assignee: GE-Hitachi Nuclear Energy Americas LLC, Wilmington, NC (US)

( * ) Notice: Subject to any disclaimer, the term of this patent is extended or adjusted under 35 U.S.C. 154(b) by 1156 days.

(21) Appl. No.: 11/777,377

(22) Filed: Jul. 13, 2007

(65) Prior Publication Data

US 2009/0016479 A1 Jan. 15, 2009

(51) Int. Cl.
*G21C 7/32* (2006.01)
(52) U.S. Cl.
USPC .......................................... 376/207; 376/210
(58) Field of Classification Search
USPC .......................................................... 376/207
See application file for complete search history.

(56) References Cited

U.S. PATENT DOCUMENTS

| | | | | |
|---|---|---|---|---|
| 4,150,546 | A | * | 4/1979 | Collett ........................... 376/211 |
| 4,343,682 | A | | 8/1982 | Grimes et al. |
| 4,605,530 | A | * | 8/1986 | Tatemichi ...................... 376/237 |
| 4,877,574 | A | * | 10/1989 | Suzuki et al. .................. 376/216 |
| 2005/0220253 | A1 | * | 10/2005 | Kitou et al. ..................... 376/260 |

FOREIGN PATENT DOCUMENTS

| | | |
|---|---|---|
| CN | 88101263 | 9/1988 |
| JP | S6168596 A | 4/1986 |
| JP | S61086689 A | 5/1986 |
| JP | H08233989 A | 9/1996 |
| JP | H10197687 A | 7/1998 |
| JP | 2006250658 A | 9/2006 |

OTHER PUBLICATIONS

Chinese Office Action dated Dec. 21, 2011 issued in corresponding Chinese Application No. 200810128374.6.
Office action from corresponding JP Application No. 2008-180839, dated Jun. 25, 2013.

* cited by examiner

*Primary Examiner* — Jack W Keith
*Assistant Examiner* — Kimberly E Coghill
(74) *Attorney, Agent, or Firm* — Harness, Dickey & Pierce, P.L.C.

(57) ABSTRACT

A system for controlling the power level of a natural circulation boiling water nuclear reactor (NCBWR) is disclosed. The system, in accordance with an example embodiment of the present invention, may include a controller configured to control a power output level of the NCBWR by controlling a heating subsystem to adjust a temperature of feedwater flowing into an annulus of the NCBWR. The heating subsystem may include a steam diversion line configured to receive steam generated by a core of the NCBWR and a steam bypass valve configured to receive commands from the controller to control a flow of the steam in the steam diversion line, wherein the steam received by the steam diversion line has not passed through a turbine. Additional embodiments of the invention may include a feedwater bypass valve for controlling an amount of flow of the feedwater through a heater bypass line to the annulus.

17 Claims, 7 Drawing Sheets

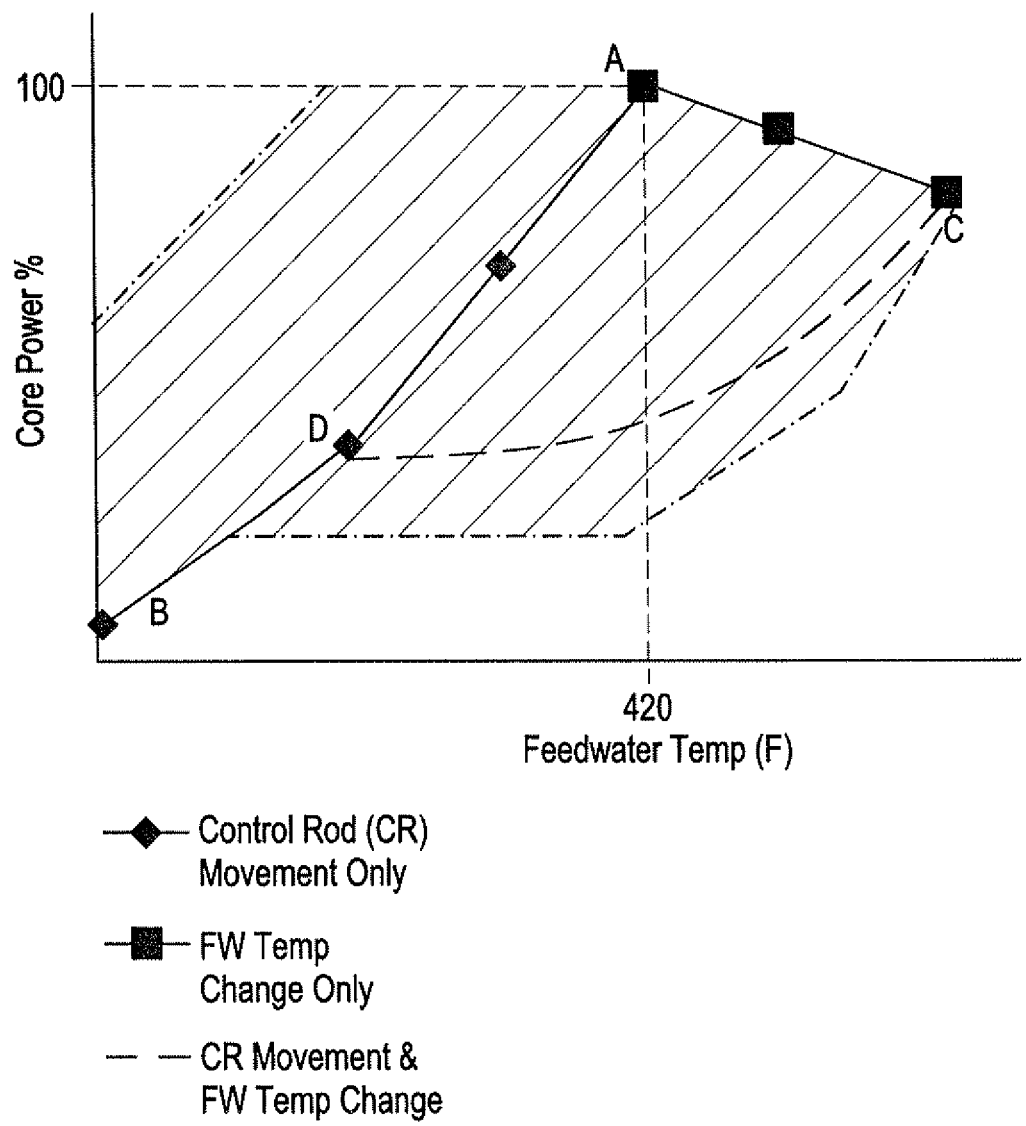

FEEDWATER TEMPERATURE CONTROL METHODS AND SYSTEMS

FEDERALLY SPONSORED RESEARCH OR DEVELOPMENT

The present invention was made with government support under contract number DE-FC07-071D14778, which was awarded by the U.S. Department of Energy. The government has certain rights in the present invention.

FIELD

The present teachings relate to systems and methods for controlling the temperature of recirculation coolant in natural recirculation boiling water nuclear reactors to thereby control the power output by the reactor.

BACKGROUND

The statements in this section merely provide background information related to the present disclosure and may not constitute prior art.

Typically, in nuclear boiling water reactors (BWRs), the amount of reactivity of the core is controlled by positioning of control rods and adjusting the amount of liquid coolant recirculation flow through the reactor core. For example, the power can be adjusted 30%-40% simply by changing the amount of recirculation flow. Generally, typical BWRs are set to operate at a relatively low power level, i.e., where the fuel bundles are operating at fairly low powers, by moving control rods and then the recirculation flow can be increased to obtain 100% power without moving any control rods. By utilizing the recirculation flow to control power output, the fuel rods and fuel pellets change power levels at a relatively slow, uniform rate, thereby avoiding pellet clad interaction (PCI) and damage to the fuel rod cladding.

However, natural circulation boiling water reactors (NCBWRs) do not include recirculation pumps, but instead employ natural circulation. Therefore, recirculation flow can not be utilized to control the power output of NCBWRs. At least some known NCBWRs manipulate the control rods to control the power level of fuel bundles, which causes the power level to change at fairly rapid, non-uniform rates. Increasing the power too rapidly as the control rods are withdrawn can cause significant damage to the fuel cladding.

SUMMARY

According to one aspect, a system for controlling the power level of a natural circulation boiling water nuclear reactor (NCBWR) is provided. In various embodiments, the system includes a heating subsystem for heating feedwater flowing into a reactor vessel of a NCBWR to increase the temperature of recirculation water flowing through the core above a predetermined recirculation water operating temperature. Additionally the system includes a temperature sensor operable to sense the temperature of the feedwater flowing into the reactor vessel. The temperature sensor is communicatively coupled with a temperature controller operable to, based on temperature readings from the temperature sensor, command the heating subsystem to increase the temperature of the feedwater flowing into the reactor vessel to a requested temperature above a predetermined operating temperature of the feedwater flowing into the reactor vessel. By increasing the temperature of the feedwater flowing into the reactor vessel, the temperature of the recirculation water is increased above the predetermined recirculation water operating temperature flowing into the core causing a reduction in the power level generated by the NCBWR core.

According to another aspect, a method for controlling the power level of a natural circulation boiling water nuclear reactor (NCBWR) is provided. In various embodiments the method includes sensing the temperature of the feedwater flowing into the reactor vessel, utilizing a temperature sensor, and increasing the temperature of the feedwater flowing into the reactor vessel, utilizing a heating subsystem of the NCBWR. The heating subsystem increases the temperature of the feedwater flowing into the reactor vessel to a requested temperature above a predetermined operating temperature of the feedwater flowing into the reactor vessel. Thus, the temperature of the recirculation water flowing into the core is increased above the predetermined recirculation water operating temperature, resulting in a reduction of the power level generated by the NCBWR core.

Further areas of applicability of the present teachings will become apparent from the description provided herein. It should be understood that the description and specific examples are intended for purposes of illustration only and are not intended to limit the scope of the present teachings.

DRAWINGS

The drawings described herein are for illustration purposes only and are not intended to limit the scope of the present teachings in any way.

FIG. 7 is a graphical representation a Power-Feedwater Temperature Map utilized with the NCBWR shown in FIG. 1, in accordance with various embodiments of the present disclosure.

DETAILED DESCRIPTION

Figure 1:
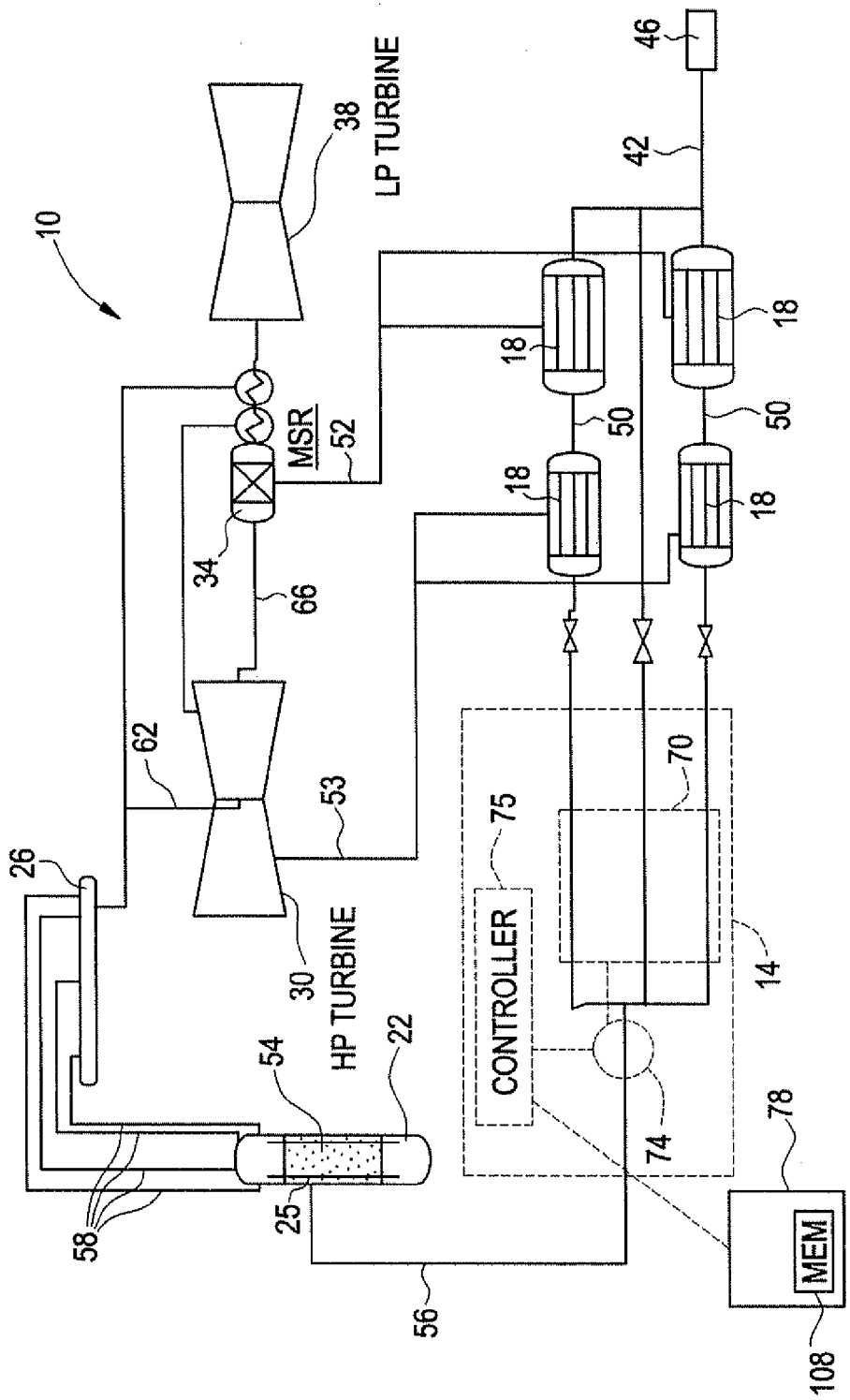
FIG. 1 is a general schematic of a natural circulation boiling water nuclear reactor (NCBWR), in accordance with various embodiments of the present disclosure.

The following description is merely exemplary in nature and is in no way intended to limit the present teachings, application, or uses. Throughout this specification, like reference numerals will be used to refer to like elements.

Referring to FIG. 1, a general schematic of a natural circulation boiling water nuclear reactor (NCBWR) 10 that includes a power level control system 14, is provided. The NCBWR 10 generally includes at least one principal feedwater heater 18, a reactor vessel 22, steam line header 26, a high-pressure steam turbine 30, a moisture separator reheater 34 and low-pressure steam turbine 38. In various embodiments, as illustrated in FIG. 1 and described herein, the NCBWR 10 includes a plurality of principal feedwater heaters 18.

The principal feedwater heaters 18 each include a feedwater heater core (not shown) that receives feedwater supplied via a feedwater input line 42 and a feedwater pump 46, or via a feedwater link line 50 and another principal feedwater heater 18. Each principal feedwater heater 18 additionally includes a steam shell (not shown) that surrounds the respective heater cores and is structured to receive high-pressure, high-temperature steam from the moisture separator reheater 34 and/or the high-pressure steam turbine 30, via steam extraction lines 52 and/or 53. Generally, steam from the high-pressure steam turbine 30 and/or the moisture separator reheater 34 is diverted to the principal feedwater heaters 18 and circulated through the respective shells to heat the feedwater flowing through the respective heater cores to a predetermined temperature, such as a normal operating temperature, e.g., less than 420° F. The heated feedwater is then fed into an annulus 25 of the reactor vessel 22, via a reactor vessel feedwater inlet line 56, where the heated feedwater is mixed with and becomes part of a recirculation flow circulating into a reactor core 54.

The recirculation flow cools the fuel rods within the reactor core 54 which, in turn, converts the water coolant to high temperature steam, e.g., 540° F., that exits the reactor vessel 22 through a plurality of reactor vessel output steam lines 58. The output steam lines 58 terminate into the steam line header 26 that regulates and controls high-temperature, high-pressure steam output to the high-pressure steam turbine 30, via a high-pressure turbine feed steam line 62. The high-temperature, high-pressure steam fed into the high-pressure steam turbine 30 is utilized to spin the turbine 30. Subsequently, at least a portion of the high-pressure, high-temperature steam exits the high-pressure steam turbine 30, via a high-pressure turbine outlet line 66. The steam output from the high-pressure turbine 30 is fed into the moisture separator reheater 34 where liquid water is removed from the steam to dry the steam. The dried steam is then fed into the low-pressure steam turbine 38. The high-temperature, low-pressure steam fed into the low-pressure steam turbine 38 is utilized to spin the turbine 38.

The power level control system 14 is structured and operable to increase the temperature of the feedwater exiting the principal feedwater heaters 18, prior to the feedwater flow entering the annulus 25 via the reactor vessel feedwater inlet line 56. More particularly, the power level control system 14 is structured and operable to controllably heat the feedwater flowing into the annulus 25 to thereby controllably increase the temperature of the recirculation water flow to a temperature above a predetermined normal recirculation water operating temperature. Increasing the temperature of the recirculation water flow to a temperature above a predetermined normal recirculation water operating temperature controllably reduces the power level output by the reactor core 54.

Generally, the power level control system 14 includes a heating subsystem 70 and a temperature sensor 74 communicatively connected to a temperature controller 75 that is communicatively connected to the heating subsystem 70. The temperature sensor 74 senses the temperature of the feedwater flowing into the reactor annulus 25 and communicates with the temperature controller 75 to monitor and control the temperature of the feedwater flowing into the reactor annulus 25. Based on temperature commands received from a control center 78, the temperature controller 75 sends command signals to the heating subsystem 70 to increase the temperature of the feedwater flowing into the reactor annulus 25 to a commanded, or requested, temperature above a normal operating temperature of the feedwater flowing into the annulus 25. The heated feedwater is fed into the annulus 25 to mix with the recirculation flow to controllably increase the temperature of the recirculation flow within the reactor core 54 to a temperature above a normal operating temperature of the recirculation flow. Accordingly, the controlled increase in temperature of the recirculation flow controllably reduces the power output level of the reactor core 54.

Figure 2:
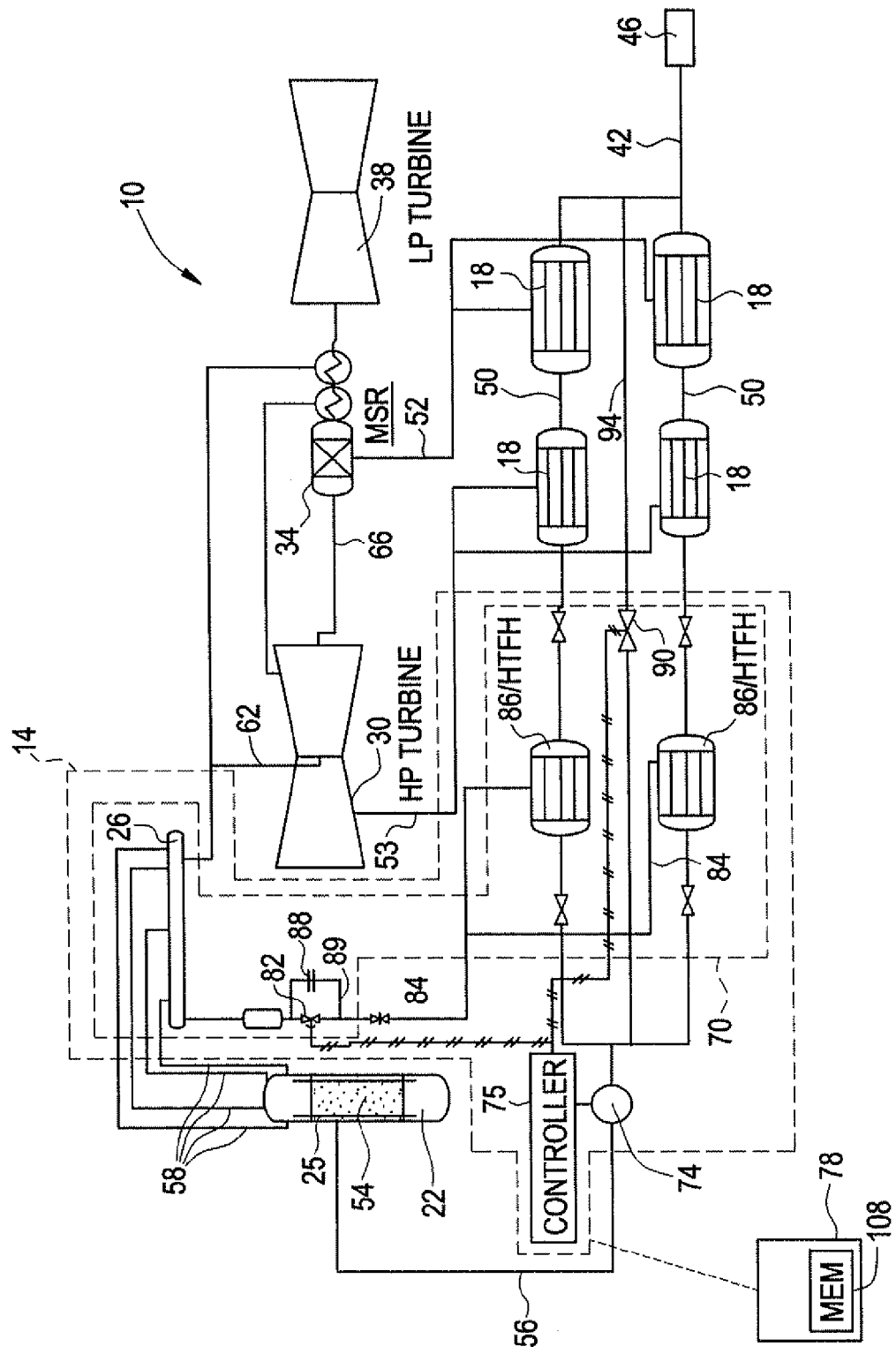
FIG. 2 is a schematic of the NCBWR shown in FIG. 1 including a power level control system, in accordance with various embodiments of the present disclosure.

Referring now to FIG. 2, in various embodiments, the heating subsystem 70 includes the steam header 26, at least one high temperature feedwater heater (HTFH) and a steam bypass valve 82. In various implementations, each HTFH is a supplemental feedwater heater 86 structured to receive an input flow of feedwater from one or more of the principal feedwater heaters 18 into a heater core (not shown). Additionally, each supplemental feedwater heater 86 is structured to receive high temperature steam from the steam header 26, via a header steam diversion line 84, into a shell (not shown) surrounding the respective heater core. Each supplemental feedwater heater 86 is further structured to output the flow of feedwater to the reactor annulus 25. When the temperature controller 75 receives commands to increase the temperature of the feedwater flowing into the reactor annulus 25, the temperature controller 75, in turn, communicates command signals to the steam bypass valve 82.

The steam bypass valve 82 receives the commands from the temperature controller 75 and, based on the received commands, controls an amount of flow of the high temperature steam from the steam header 26 into the shell(s) of the supplemental feedwater heater(s) 86. As the high temperature steam circulates through the respective shell(s), the feedwater from the principal feedwater heater(s) 18 flowing through the respective supplemental feedwater heater core(s) is heated. Based on temperature reading sensed by the temperature sensor 74, the temperature controller 75 communicates with the steam bypass valve 82 to control the amount of high temperature steam flowing into the supplemental feedwater heater(s) 86. Thus, based on the requested temperature received from the control center 78, the temperature sensor 74 and controller 75 establish a feedback loop to control the increase in temperature of the feedwater flow output to the reactor annulus 25. More particularly, the sensor/controller 74/75 feedback loop adjusts temperature of the feedwater flow to obtain the requested temperature above the normal operating temperature of the feedwater flowing into the reactor annulus 25.

In various embodiments, an orifice 88 is provided in a bypass line 89 around the steam bypass valve 82 to provide for a constant steam flow through the header steam diversion line 84 in order to keep the header steam diversion line 84 and the shell side of the supplemental/high temperature feedwater heater(s) 86 warm and ready for use on demand.

With further reference to FIG. 2, in various embodiments, the heating subsystem 70 further includes a feedwater bypass valve 90 operable to also receive commands from the temperature controller 75. In response to the received commands, the feedwater bypass valve 90 controls an amount of flow of the feedwater through a heater bypass line 94 that directs a flow of feedwater from the feedwater pump 46 into the reactor annulus 25. The temperature of the feedwater flowing from the feedwater pump 46 is significantly lower than the feedwater flowing from the principal and supplemental feedwater heaters 18 and 86. Therefore, an increase in the flow of feedwater through the heater bypass line 94, as commanded by the temperature controller 75, will decrease the temperature of the feedwater flowing into the reactor annulus 25. For example, in response to a request from the control center 78 to increase the power level output by the reactor core 54, i.e., a request to lower the temperature of the feedwater flowing into the reactor annulus 25 to a specific temperature, the temperature sensor and controller combination 74/75 will increase the flow of feedwater flowing through the heater bypass line 94.

The increase of lower temperature water flowing through the heater bypass line 94 will reduce the temperature of the feedwater flowing into the reactor annulus 25. More particularly, the temperature sensor 74 and temperature controller 75 control the flow of feedwater through the heater bypass line 94 to reduce the temperature of the feedwater flowing into the reactor annulus 25 to reduce the temperature of the recirculation water within the reactor core 54 to a requested temperature below the normal operating temperature, thereby increasing the power level generated by the reactor core 54. Therefore, in various embodiments, the power level control system 14 controls the power level output by the reactor core 54 by increasing the temperature of the feedwater flow to decrease the power output, and decreasing the temperature of the feedwater flow to increase the power output.

Figure 3:
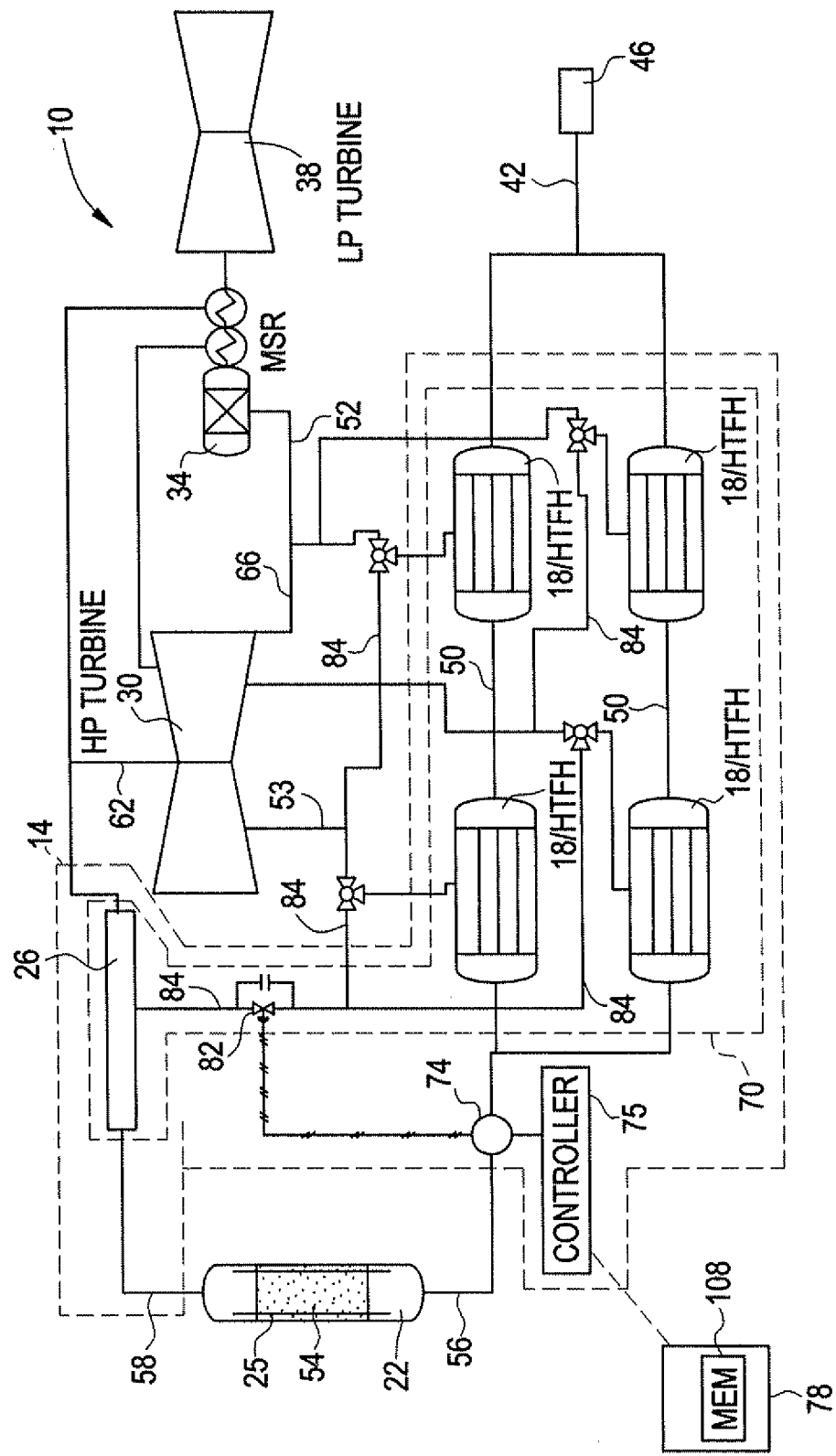
FIG. 3 is a schematic of the NCBWR shown in FIG. 1 including a power level control system, in accordance with various other embodiments of the present disclosure.
Figure 4:
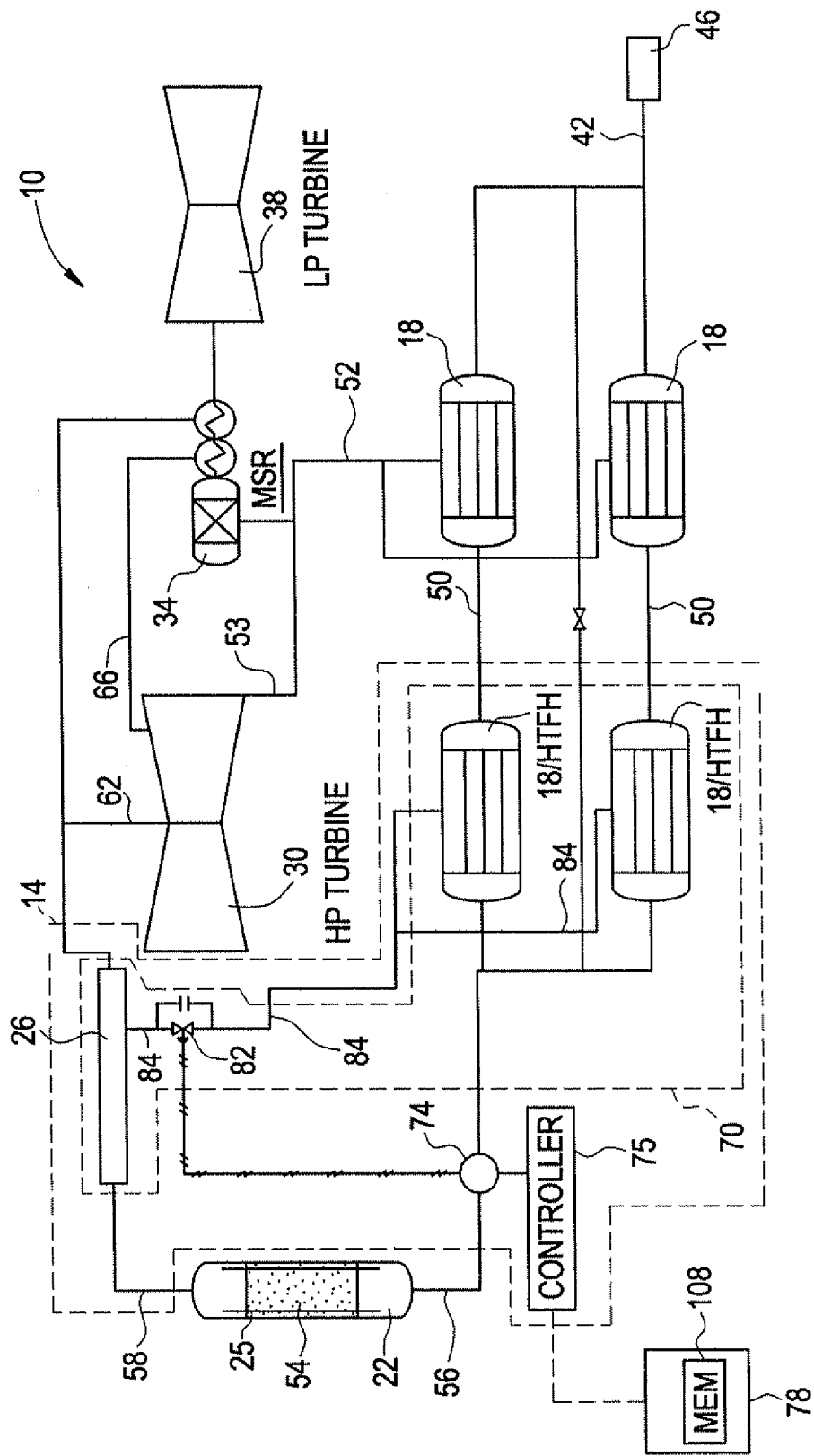
FIG. 4 is a schematic of the NCBWR shown in FIG. 1 including a power level control system, in accordance with yet other various embodiments of the present disclosure.

Referring now to FIGS. 3 and 4, in various other embodiments, the NCBWR includes a plurality of the principal feedwater heaters 18, wherein at least one of the principal feedwater heaters 18 also functions as HTFHs.

In some embodiments, each of the principal feedwater heaters 18 is structured to also function as an HTFH, as shown in FIG. 3. In such embodiments, each HTFH/principal feedwater heater 18 is structured to receive high-pressure, high-temperature steam from the high-pressure steam turbine 30 and/or the moisture separator reheater 34, via steam extraction lines 53 and/or 52, to heat the flow of feedwater output to the reactor core 54 to the normal operating temperature. Additionally, in such embodiments, each HTFH/principal feedwater heater 18 is structured to receive high temperature steam from the steam header 26 to increase the temperature of the feedwater output to the reactor annulus 25 to a requested temperature above the normal operating temperature, as described above.

Alternatively, in some embodiments, the principle feedwater heaters 18 nearest the feedwater pump 46 (the initial principle feedwater heaters 18) would receive extraction steam only from the high pressure steam turbine 30 via steam extraction lines 53 and not from either of the steam header 26 or the moisture separator/reheater 34. Accordingly, the temperature of feedwater flowing from the initial principle feedwater heaters 18 to the subsequent principle feedwater heaters 18 will increase above the normal operation temperature.

In other embodiments, only a portion of the plurality of principal feedwater heaters 18 are structured to also function as a HTFH, as shown in FIG. 4. In such embodiments, each non-HTFH principal feedwater 18 is structured to receive high-pressure, high-temperature steam from the high-pressure steam turbine 30 and/or the moisture separator reheater 34, via steam extraction lines 53 and/or 52, to heat the flow of feedwater output to the reactor annulus 25 to the normal operating temperature, as described above. However, each HTFH/principal feedwater heater 18 is structured to receive high temperature steam from the steam header 26, via the header steam diversion line 84.

Each HTFH/principal feedwater heater 18 is structured such that, when normal operation temperature of the feedwater is requested, steam from the steam header 26 is utilized by the HTFH/principal feedwater heater(s) 18 to heat the flow of feedwater output to the reactor annulus 25 to the normal operating temperature. Furthermore, when a feedwater temperature above the normal operation temperature is requested, each HTFH/principal feedwater heater 18 utilizes additional high temperature steam from the steam header 26 to increase the temperature of the feedwater output to the reactor core 54 to the requested temperature.

Thus, with further reference to FIGS. 3 and 4, when the temperature controller 75 receives commands to increase the temperature of the feedwater flowing into the reactor annulus 25, the temperature controller 75 commands the steam bypass valve 82 to increase the amount of high temperature steam allowed to flow from the steam header 26 into each HTFH/principal feedwater heater 18. The increase of high temperature steam flowing through the shell of each HTFH/principal feedwater heater 18 increases the temperature of the feedwater flowing through the respective heater core(s) and output to the reactor annulus 25 to the requested/commanded temperature. Accordingly, the increase in temperature of the feedwater flowing into the reactor annulus 25 increases the temperature of the recirculation water within the reactor core 54, thereby reducing the power output level of the reactor vessel 22, without manipulation of control rods within the reactor vessel 22.

Figure 5:
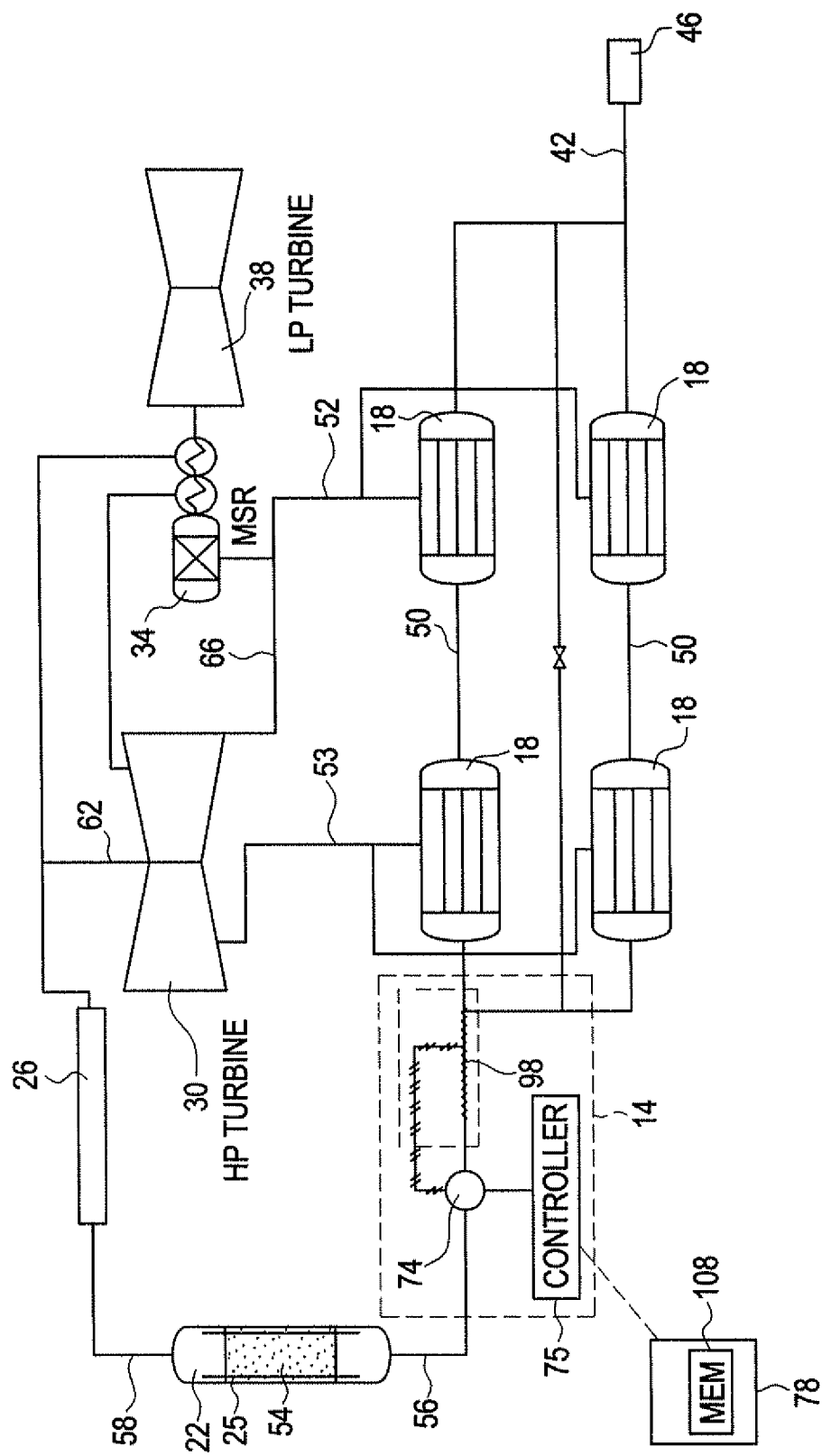
FIG. 5 is a schematic of the NCBWR shown in FIG. 1 including a power level control system, in accordance with still other various embodiments of the present disclosure.

Referring now to FIG. 5, in various embodiments, the heating subsystem 70 includes a heating device 98 structured and operable to heat the feedwater flowing from the principal feedwater heater(s) 18 into the reactor annulus 25. More particularly, the heating device 98 is responsive to commands from the temperature controller 75 to increase the temperature of the feedwater flowing into the reactor annulus 25 to a requested temperature above the normal operating temperature, as sensed by the temperature sensor 74. For example, in response to a request from the control center 78 to decrease the power level output by the reactor core 54 the temperature controller 75 will command the heating device 98 to increase the temperature of the feedwater flowing into the reactor annulus 25 to the requested temperature. Accordingly, the temperature of the recirculation flow within the reactor core 54 will be increased and the power level output by the reactor vessel 22 will decrease to a requested level that corresponds to the temperature reduction of the recirculation flow.

The heating device 98 may be any heating device suitable for heating the feedwater flowing into the reactor annulus 25 to the requested temperature above the normal operating temperature produced by the principal feedwater heaters 18. For example, the heating device 98 may be a suitable gas or electric power water heating device.

Figure 6:
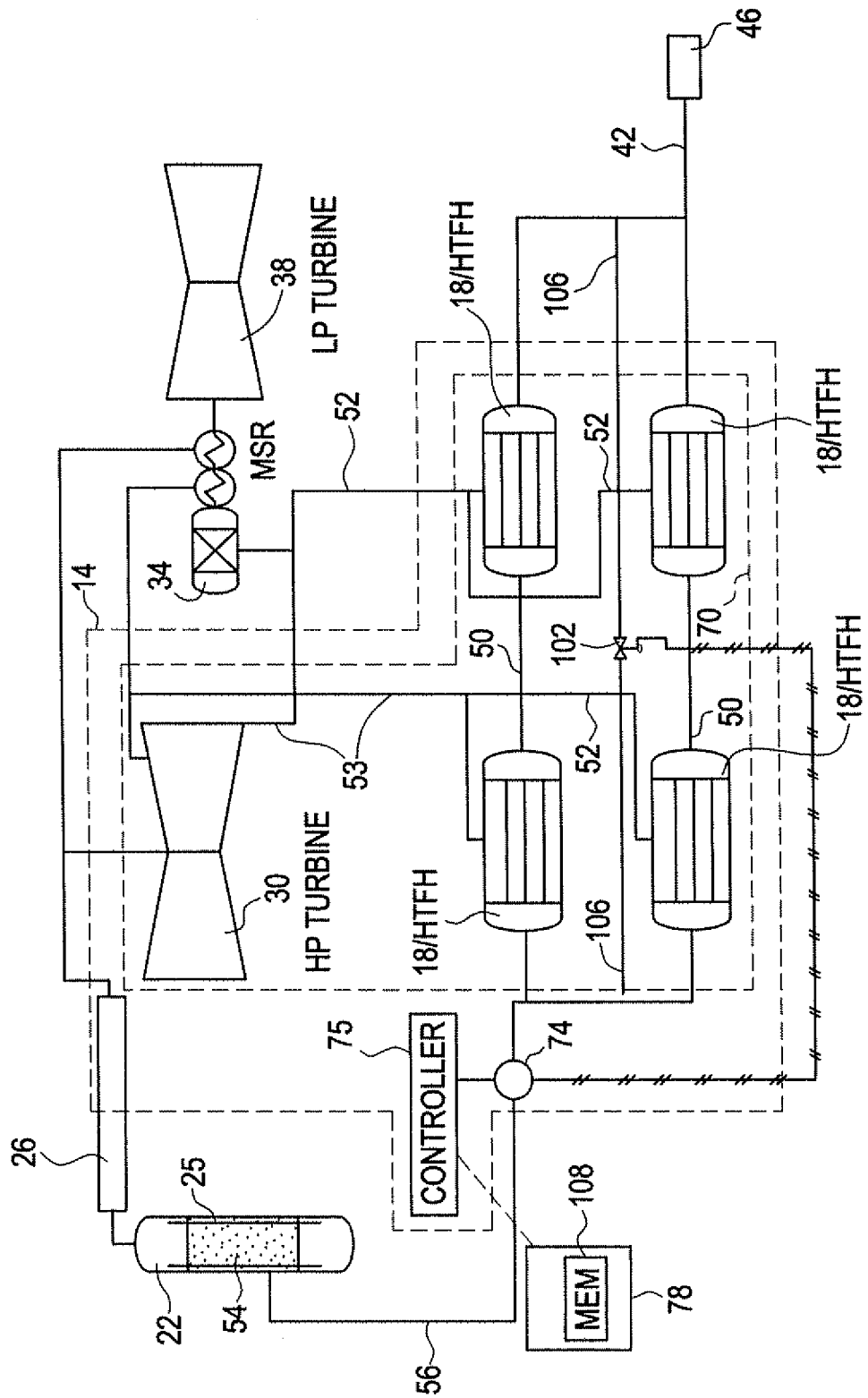
FIG. 6 is a schematic of the NCBWR shown in FIG. 1 including a power level control system, in accordance with still yet other various embodiments of the present disclosure.

Referring now to FIG. 6, in various embodiments, each of the principal feedwater heaters 18 is structured to function as a HTFH. In such embodiments, each HTFH/principal feedwater heater 18 is structured to receive high-pressure, high-temperature steam from the high-pressure steam turbine 30 and/or the moisture separator reheater 34, via steam extraction lines 53 and/or 52, to heat the flow of feedwater output to the reactor annulus 25 to a temperature above the normal operating temperature. Additionally, in such embodiments, the heating subsystem 70 includes a feedwater bypass valve 102 operable to receive commands from the temperature controller 75. In response to the received commands, the feedwater bypass valve 102 controls an amount of flow of the feedwater through a heater bypass line 106 that directs a flow of feedwater from the feedwater pump 46 into the reactor annulus 25. The temperature of the feedwater flowing from the feedwater pump 46 is significantly lower than the feedwater flowing from the HTFH/principal feedwater heaters 18. Therefore, an increase in the flow of feedwater through the heater bypass line 106, as sensed by the temperature sensor 74 and commanded by the temperature controller 75, will decrease the temperature of the feedwater flowing into the reactor annulus 25.

Thus, in such embodiments, the temperature sensor and controller combination 74/75 controls the operation of the feedwater bypass valve to reduce the temperature of the feedwater flowing into the reactor annulus 25 to any requested temperature. For example, in response to a request from the control center 78 to achieve a given power level output by the reactor core 54, e.g., 90% maximum power output, the temperature controller 75 will allow a flow of feedwater through the heater bypass line 106 sufficient to cool the feedwater flowing out of the HTFH/principal feedwater heaters 18 to a temperature sufficient to achieve the requested power level output. Accordingly, to increase the power level output, the temperature controller 75 will command an increase in the flow of feedwater through the heater bypass line 106 to reduce the temperature of the feedwater and recirculation flows, as sensed by the temperature sensor 74. Conversely, to decrease the power level output, the temperature controller 75 will command a decrease in the flow of feedwater through the heater bypass line 106 to increase the temperature of the feedwater and recirculation flows.

Referring now to FIG. 7, in accordance with various embodiments, two independent mechanisms of power output level change of the reactor core 54, i.e., control rod movement and feedwater temperature change, may be combined to construct a Core Power-Feedwater Temperature Map, such as the exemplary map illustrated in FIG. 7. The line B-A represents the power ascension line, e.g., from approximately 25% to 100% power, by the conventional control rod withdrawal only. The temperature of the feedwater flowing into the reactor annulus 25 will increase automatically since more high-pressure, high-temperature steam from the high-pressure steam turbine 30 and/or the moisture separator reheater 34 is available to heat the feedwater as the reactor power level increases. The slope of line B-A depends on the steam extraction points and the design of the balance of the plant system including the principal feedwater heaters 18.

The line A-C represents the reduction of reactor power as the temperature of the feedwater flowing into the reactor annulus 25 is increased above the normal operating temperature, e.g., 420° F. using the various power level control system 14 embodiments described above. The A-C line may also be referred to as the 100% load line to indicate that no control rod movement is employed along the A-C line. A 'Rod Block' line above and parallel to the line A-C may be developed and implemented to ensure that feedwater temperature is not changing in a manner that would allow the fuel pins to get too hot.

The D-C line represents a path where both feedwater temperature and control rod positions are changed in small steps. The D-C line may be followed during startup of the reactor vessel 22 to bring the reactor core to point C, e.g., 85% power with a recirculation flow temperature above the normal operating temperature. Necessary control rod adjustments may be done and the feedwater temperature may be reduced to traverse the path from C to A in order to bring the reactor vessel 22 to 100% power output with the temperature of the feedwater flowing into the reactor annulus 25 at normal operating temperature, e.g., approximately 420° F. The reversed path A-C-D-B may be traversed during power suppression testing or other reactor power maneuvering.

The hatched area of FIG. 7 is an exemplary representation of a possible operating domain of the NCBWR 10 using temperature control of the feedwater flowing into the reactor annulus 25 in conjunction with different control rod positioning to control the power level output by the reactor vessel 22, as described above. Thus, operators at the control center 78 may utilize Power-Feedwater Temperature Map as a tool and/or guide to provide a conceptual understanding of the effects on power level output that will result from any particular commanded change in feedwater temperature.

Additionally, the control center 78 may store the Power-Feedwater Temperature Map in a memory device 108, or other database, and execute an control algorithm stored on memory device 108 to automatically communicate with the temperature controller 75 to automatically control the temperature of the feedwater flowing into the reactor annulus 25, as described above. That is, an operator may select a desired power level output, i.e., input a desired power level output into computer-based systems of the control center 78. In response thereto, the computer-based systems of the control center 78 will execute the control algorithm and access the stored Power-Feedwater Temperature Map to obtain the temperature to produce the desired power level output. Subsequently, the control center 78 will communicate a feedwater temperature command, or a sequence of feedwater temperature commands, to the temperature controller 75. These commands provide, at least in part, the temperature obtained from the Power-Feedwater Temperature Map for producing the desired power level output. Thus, execution of the control algorithm generates one or more temperature command signals set to the temperature controller 75. In response to the commanded temperature, the temperature controller 75 establishes a feed-back control loop, based on output from the temperature sensor 74, to automatically adjust the temperature of the feedwater flowing into the reactor annulus 25 to the commanded temperature.

More specifically, in response to the temperature command signal(s), the temperature controller 75 iteratively communicates with the temperature sensor 74 to control the operation of the applicable bypass valve, e.g., bypass valve 82, 90 or 102, to adjust the temperature of the feedwater flowing into the reactor annulus 25. Moreover, automatically adjusting the temperature of the feedwater flowing into the reactor annulus 25, automatically adjusts the temperature of the recirculation flow circulating into a reactor core 54, resulting in adjustments to the power level output to the desired level.

The control center 78 may further include other computer based components (not shown), such as a processor, a display, a user interface, e.g., a keyboard, mouse, stylus, touch screen etc. and other interfaces and/or memory devices suitable for executing and performing the automated control described above.

Thus, the power level control system 14, described herein is structured and operable to independently change the temperature of the feedwater flowing into the reactor annulus 25 to thereby uniformly change the core power output level without the need for control rod movement.

The description herein is merely exemplary in nature and, thus, variations that do not depart from the gist of that which is described are intended to be within the scope of the teachings. Such variations are not to be regarded as a departure from the spirit and scope of the teachings.

What is claimed is:

1. A system for controlling the power level of a natural circulation boiling water nuclear reactor (NCBWR), said system comprising:

a heating subsystem for heating feedwater flowing into an annulus of the NCBWR, the heating subsystem including a steam diversion line configured to receive steam generated by a core of the NCBWR, and a steam bypass valve configured to control a flow of the steam in the steam diversion line, wherein the steam received by the steam diversion line has not passed through a turbine;

a temperature sensor operable to sense a temperature of the feedwater flowing into the annulus; and a controller configured to control a power output level of the NCBWR by controlling the heating subsystem, based on the sensed temperature, to adjust the temperature of the feedwater flowing into the annulus to a desired temperature, wherein the steam bypass valve is configured to be controlled by the controller and controlling the heating subsystem includes controlling the steam bypass valve, wherein the heating subsystem includes a feedwater bypass valve operable to receive commands from the controller and based on the received commands, control an amount of flow of the feedwater through a heater bypass line to the annulus.

2. The system of claim 1, wherein the heating subsystem further includes a steam header configured to receive the steam generated by the core and configured to transfer the steam to the steam diversion line;

at least one feedwater heater configured to receive a flow of feedwater, receive steam from the steam diversion line, and output the flow of feedwater to the annulus, wherein the steam bypass valve is configured to control the flow of the steam from the steam diversion line to the at least one feedwater heater to increase the temperature of the feedwater thereby increasing a temperature of the feedwater to the annulus to a requested temperature such that a temperature of recirculation water flowing through the core is increased resulting in a reduction in the power level generated by the NCBWR core.

3. The system of claim 2, wherein the at least one feedwater heater includes at least one supplemental feedwater heater configured to receive the flow of feedwater from one or more principal feedwater heaters and configured to heat the flow of feedwater input to the at least one supplemental feedwater heater to a temperature of the feedwater flowing into the annulus.

4. The system of claim 2, wherein the at least one feedwater heater includes one or more principal feedwater heaters operable to heat the flow of feedwater output to the annulus to a predetermined operating temperature and to increase the temperature of the feedwater flow output to the annulus to the requested temperature above the predetermined operating temperature when the steam bypass valve is commanded to increase the amount of flow of the steam from the steam diversion line.

5. The system of claim 4, wherein each of the one or more principal feedwater heaters are configured to receive steam from one of a turbine of the NCBWR and a moisture separator reheater of the NCBWR to heat the flow of feedwater output to the annulus to the predetermined operating temperature, and receive steam from the steam diversion line to increase the temperature of the feedwater flow output to the annulus to the requested temperature above the predetermined operating temperature.

6. The system of claim 4, wherein the one or more principal feedwater heaters include a plurality of principal feedwater heaters, at least one of the principal feedwater heaters being configured to receive steam from at least one of a turbine of the NCBWR and a moisture separator reheater of the NCBWR to heat the flow of feedwater output to the annulus to the predetermined operating temperature, and at least one of the principal feedwater heaters being configured to receive steam from the steam diversion line to heat the flow of feedwater output to the annulus to the predetermined operating temperature and to increase the temperature of the feedwater flow output to the annulus to the requested temperature above the predetermined operating temperature, as controlled by the controller and the steam bypass valve.

7. The system of claim 2, wherein the controller is configured to increase the power level generated by the NCBWR core by controlling the feedwater bypass valve to adjust an amount of flow of the feedwater through the heater bypass line into the annulus to decrease the temperature of the feedwater flowing into the annulus to a requested temperature below the predetermined operating temperature.

8. The system of claim 1, wherein the heating subsystem includes a heating device configured to receive commands from the temperature controller and based on the received commands, increase the temperature of feedwater flowing through a feedwater line from at least one principal feedwater heater of the NCBWR to the annulus.

9. A system for controlling the power level of a natural circulation boiling water nuclear reactor (NCBWR), the system comprising:

a plurality of principal feedwater heaters;

a heating subsystem for heating feedwater flowing into an annulus of the NCBWR;

a temperature sensor operable to sense a temperature of the feedwater flowing into the annulus; and a controller operable to control a power output level of the NCBWR by controlling the heating subsystem, based on the sensed temperature, to adjust the temperature of the feedwater flowing into the annulus to a desired temperature, wherein the heating subsystem includes at least one of the principal feedwater heaters operable to heat the flow of feedwater output to the annulus to a temperature higher than a predetermined operating temperature, and a feedwater bypass valve operable to receive commands from the temperature controller and based on the received commands, control an amount of flow of the feedwater through a heater bypass line to the annulus to increase the temperature of the feedwater flowing into the annulus to a requested temperature ranging from a maximum feedwater temperature to the predetermined operating temperature when a reduction in reactor core output power is desired, and decrease the temperature of the feedwater flowing into the annulus to a requested temperature below the predetermined operating temperature to increase the power level generated by the NCBWR core.

10. The system for controlling the power level of a natural circulation boiling water nuclear reactor (NCBWR) according to claim 9, wherein the heater bypass line is configured to receive feedwater from a feedwater pump.

11. A system for controlling the power level of a natural circulation boiling water nuclear reactor (NCBWR) according to claim 9, wherein the heater bypass line is configured to transfer the feedwater from a feedwater pump to a reactor vessel feedwater inlet line without passing the feedwater through a heat exchanger.

12. A system for controlling the power level of a natural circulation boiling water nuclear reactor (NCBWR), said system comprising:

a heating subsystem for heating feedwater flowing into an annulus of the NCBWR to change a temperature of recirculation water flowing through the core;

a temperature sensor operable to sense a temperature of the feedwater flowing into the annulus; and a temperature controller communicatively connected to the temperature sensor and operable to, based on reading from the sensed temperature, control the power level generated by the NCBWR core by commanding the heating subsystem to change the temperature of the feedwater flowing into the annulus to a requested temperature to change the temperature of the recirculation water from a predetermined recirculation water operating temperature, the heating subsystem comprising:

a steam header structured to receive steam generated by the reactor core;

at least one feedwater heater structured to receive an input flow of feedwater, receive steam from the steam header and output the flow of feedwater to the annulus;

a steam bypass valve operable to receive commands from the temperature controller and based on the received commands, control an amount of flow of the steam from the steam header into the at least one feedwater heater to change the temperature of the feedwater flow output to the annulus to the requested temperature, wherein the steam into the feedwater heater from the steam header has not passed through a turbine; and a feedwater bypass valve operable to receive commands from the temperature controller and based on the received commands, control an amount of flow of the feedwater through a heater bypass line to the annulus.

13. The system of claim 12, wherein the at least one feedwater heater comprises at least one supplemental feedwater heater structured to receive the input flow of feedwater from one or more principal feedwater heaters operable to heat the flow of feedwater input to the at least one supplemental feedwater heater to a predetermined operating temperature of the feedwater flowing into the annulus.

14. The system of claim 12, wherein the at least one feedwater heater comprises one or more principal feedwater heaters operable to heat the flow of feedwater output to the annulus to a predetermined operating temperature and to increase the temperature of the feedwater flow output to the annulus to the requested temperature above the predetermined operating temperature when the steam bypass valve is commanded to increase the amount of flow of the steam from the steam header.

15. The system of claim 14, wherein each of the one or more principal feedwater heaters are structured to:

receive steam from one of a turbine of the NCBWR and a moisture separator reheater of the NCBWR to heat the flow of feedwater output to the annulus to the predetermined operating temperature, and receive steam from the steam header to increase the temperature of the feedwater flow output to the annulus to the requested temperature above the predetermine operating temperature.

16. The system of claim 14, wherein the one or more principal feedwater heaters comprise a plurality of principal feedwater heaters, at least one of the principal feedwater heaters structured to receive steam from at least one of a turbine of the NCBWR and a moisture separator reheater of the NCBWR to heat the flow of feedwater output to the annulus to the predetermined operating temperature, and at least one of the principal feedwater heaters structured to receive steam from the steam header to heat the flow of feedwater output to the annulus to the predetermined operating temperature and to increase the temperature of the feedwater flow output to the annulus to the requested temperature above the predetermined operating temperature, as controlled by the temperature sensor, the temperature controller and the steam bypass valve.

17. A system for controlling the power level of a natural circulation boiling water nuclear reactor, said system comprising:

a boiling water reactor vessel having a reactor annulus for receiving water from at least one feedwater heater and mixing the feedwater with recirculation water before the water mixture flows to a core of the reactor;

a steam line header structured to receive steam generated by the reactor vessel and control the flow of the steam to at least one steam turbine;

at least one steam communication line connected between the steam line header and the at least one feedwater heater;

a steam bypass valve operable to control the flow of steam from the steam line header to the at least one feedwater heater through the at least one steam communication line, wherein the steam passing through the at least one steam communication line has not been passed through a turbine;

a temperature sensor operable to sense a temperature of the water flowing from the at least one feedwater heater to the reactor vessel water recirculation input;

a temperature controller communicatively connected to the temperature sensor and operable to control the power level generated by the NCBWR core by controlling operation of the steam bypass valve, based on the sensed temperature, to control an amount of bypass steam allowed to flow from the steam header into the at least one feedwater heater to change the temperature of the water flowing into the reactor annulus from the at least one feedwater heater; and a feedwater bypass valve operable to receive commands from the controller and based on the received commands, control an amount of flow of the feedwater through a heater bypass line to the annulus.

* * * * *

UNITED STATES PATENT AND TRADEMARK OFFICE
CERTIFICATE OF CORRECTION

PATENT NO. : 8,705,682 B2
APPLICATION NO. : 11/777377
DATED : April 22, 2014
INVENTOR(S) : Stephan Craig Moen et al.

It is certified that error appears in the above-identified patent and that said Letters Patent is hereby corrected as shown below:

In the Specification

Column 1, line 5-10 should read as follows

The present invention was made with government support under contract number DE-FC07-07ED14778, which was awarded by the U.S. Department of Energy. The government has certain rights in the present invention.

Signed and Sealed this
Second Day of December, 2014

Michelle K. Lee
*Deputy Director of the United States Patent and Trademark Office*